No. 776,210. PATENTED NOV. 29, 1904.
S. R. WELCH.
INSECT TRAP.
APPLICATION FILED DEC. 9, 1903.
NO MODEL.
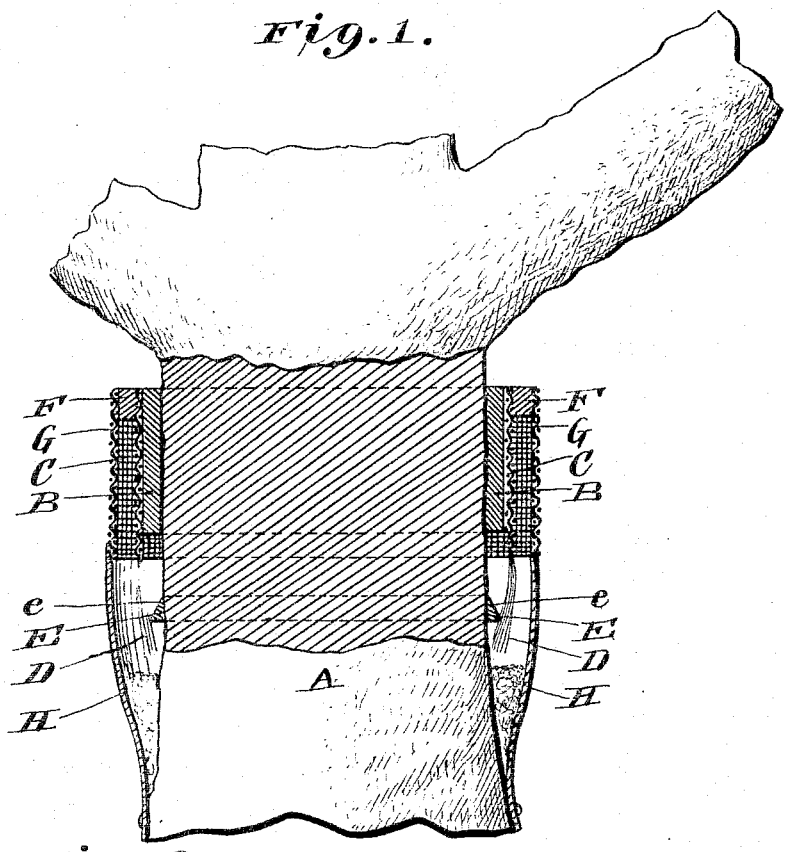
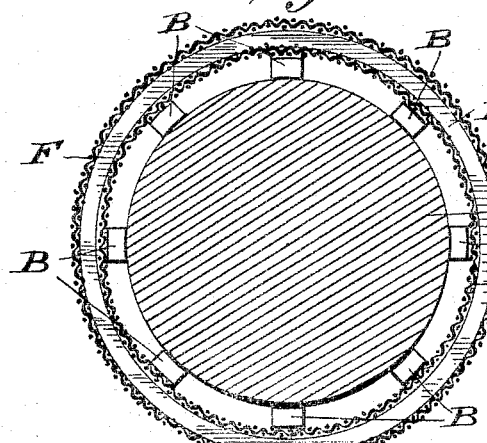
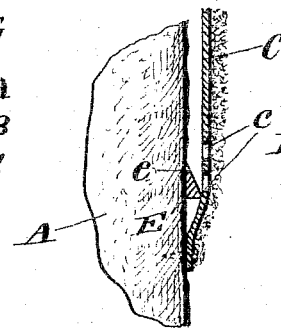

No. 776,210.

Patented November 29, 1904.

UNITED STATES PATENT OFFICE.

STEPHEN R. WELCH, OF GRAND JUNCTION, COLORADO.

INSECT-TRAP.

SPECIFICATION forming part of Letters Patent No. 776,210, dated November 29, 1904.

Application filed December 9, 1903. Serial No. 184,486. (No model.)

*To all whom it may concern:*

Be it known that I, STEPHEN R. WELCH, a citizen of the United States, residing at Grand Junction, in the county of Mesa and State of Colorado, have invented certain new and useful Improvements in Insect-Traps, of which the following is a specification.

My invention relates to traps for catching the codling or apple worm and destroying the moth after transformation therefrom. The apple-worm after emerging from the fruit crawls along the limb of the tree and down its trunk, seeking a shelter where it may spin its cocoon, but seldom finds a suitable place on the tree, and so keeps on till it reaches the ground, where it eventually spins its cocoon.

The object of my invention is to provide a seductive shelter on the fruit-tree for the worm, having a comfortable place in which to spin its cocoon and an entrance so arranged that after it is once in it cannot get out either while in the larva state or after transformation to a moth.

The construction, operation, and advantages of my invention will more fully appear hereinafter and by reference to the accompanying drawings, in which—

Figure 1 is a view in vertical section of a fragment of a tree, showing my invention in position; Fig. 2, a cross-sectional view of the tree and trap, and Fig. 3 a view of a modification of material used for the entrance to the trap.

In the drawings similar reference characters indicate corresponding parts throughout the several figures.

A represents a tree-trunk, and B small blocks of wood or other suitable material secured thereto.

C represents a strip of fabric secured to blocks B, which, as shown in Figs. 1 and 2, consists of a wire-gauze, while in Fig. 3 the skin of an animal having a fleece is shown. The space between the surface of the tree and the strip of fabric C constitutes the entrance to the trap, which, as shown, opens upwardly. As shown in Fig. 1, I provide a strip of long hairs, bristles, or other suitable brush-like material D, which is preferably woven into the lower edge of the wire fabric C and depends therefrom. The purpose of the strip of hair, &c., D, is to close the entrance of the trap, so that the larva or the moth cannot escape therefrom. In the modification shown in Fig. 3 holes $c$ are provided in the hide, through which the larva crawls and which are hid on the inside of the trap by the fleece.

In order to prevent the larva from spinning its cocoon in the hairs of the strip D or under the shelter of the skin, (shown in Fig. 3,) I provide a narrow girdle E, having a beveled upper edge $e$, to hold the hairs from contact with the tree-trunk. The beveled edge $e$ is designed to urge the worm to continue on through strip D or holes $c$ and does not form a convenient place for spinning its cocoon, as might be the case if the top edge should be left perpendicular to the tree.

F represents a band or girdle secured over the upper edge of strip C, and G a strip of wire-gauze fabric secured to said band or girdle F.

H represents a piece of fabric, preferably of waterproof material and opaque in nature—such as dark-colored duck, oil-cloth, &c.—the lower edge of said piece of fabric H being secured to the tree-trunk and forming a bag-like structure. Inside of said bag-like structure I insert cotton-batting, burlap, or other suitable material, in which the worm after entering the trap through the entrance above described spins its cocoon.

When the moth emerges from its cocoon, it immediately seeks the light which enters through the strip of gauze G, but is prevented from leaving the trap by said strip G and girdle F and after four or five days dies.

It will be apparent that the lighted chamber adds to the efficiency of the trap by attracting the moths from the nesting-chamber, where if they remained they would not only disturb the worms entering to make nests, but might find an exit through the hair-bristles. The lighted chamber also serves to ventilate the trap, so that the tree-bark will not be damaged by dampness and the trap also will be more attractive to the worm.

It will be understood that the trap is placed on the tree just below the limbs and is allowed to remain thereon from early spring until after the fruit has been harvested, when it may be removed and cleaned.

The entrance shown in Fig. 1 would be suitable for use in sections where there is considerable rainfall, while the skin (shown in Fig. 3) would be better adapted to hot arid sections.

Having thus described my invention, what I claim is—

1. In an insect-trap, an entrance having its return-passage obstructed, a chamber over said entrance covered by a gauze fabric, a piece of substantially opaque material secured to said gauze fabric at one edge and having its other edge suitably secured, and soft, fuzzy material under said opaque material, substantially as shown and described.

2. In an insect-trap, in combination with a tree-trunk, a band of fabric encircling said tree-trunk and spaced apart therefrom, means secured to the lower edge of said fabric to obstruct the opening between it and the tree-trunk, a lighted chamber over said band of fabric, and a dark chamber communicating with said lighted chamber and having a nest-inducing material therein, substantially as shown and described.

3. In an insect-trap, in combination with a tree-trunk, a band of fabric encircling said tree-trunk and spaced apart therefrom, a strip of brush material secured to the lower edge of said fabric, a lighted chamber over said band of fabric, a dark chamber communicating with said lighted chamber, and soft, fuzzy material in said dark chamber, substantially as shown and described.

4. In an insect-trap, in combination with a tree-trunk, a band of fabric encircling said tree-trunk and spaced apart therefrom, a strip of brush-bristles secured to the lower edge of said band of fabric, a lighted chamber over said band of fabric, a dark chamber communicating with said lighted chamber, and soft, fuzzy material in said dark chamber, substantially as shown and described.

5. In an insect-trap, in combination with a tree-trunk, a band of wire-gauze fabric encircling said tree-trunk and spaced apart therefrom, a strip of brush-bristles secured to the lower edge of said band of wire-gauze fabric, a chamber above said band of wire-gauze fabric, closed at its top and covered by another band of wire-gauze, a piece of opaque material secured to the lower edge of said band of fabric and to the tree-trunk, and soft, fuzzy material in the space inclosed by said opaque material, substantially as shown and described.

6. In an insect-trap, in combination with a tree-trunk, blocks secured thereto, a band of wire-gauze fabric encircling said tree-trunk and secured to said blocks, a strip of stiff hairs woven into the lower edge of said strip of wire-gauze fabric, a band or girdle secured at the upper edge of said band of wire-gauze fabric, a strip of wire-gauze fabric secured to said band or girdle and depending therefrom, a piece of waterproof fabric secured to the lower edge of said strip of wire-gauze fabric on its upper edge and to the tree-trunk on its lower edge, and cotton-batting in the space inclosed by said waterproof fabric and the tree-trunk, substantially as shown and described.

7. In an insect-trap, in combination with a tree-trunk, a band of fabric encircling said tree-trunk and spaced apart therefrom, means secured to the lower edge of said fabric to obstruct the opening between it and the tree-trunk, a girdle, under said concealing means, having its upper edge beveled, a lighted chamber over said band of fabric, and a nesting-chamber communicating with said lighted chamber, substantially as shown and described.

8. In an insect-trap, in combination with a tree-trunk, a band of wire-gauze fabric encircling said tree-trunk and spaced apart therefrom, a strip of brush material secured to the lower edge of said band of wire-gauze fabric, a girdle, under said strip of brush material, having a beveled upper edge, a lighted chamber over said band of wire-gauze fabric, and a nesting-chamber communicating with said lighted chamber, substantially as shown and described.

9. In an insect-trap, in combination with a tree-trunk, blocks secured thereto, a band of wire-gauze fabric encircling said tree-trunk and secured to said blocks, a strip of stiff hairs woven into the lower edge of said strip of wire-gauze fabric, a narrow girdle, secured to the tree-trunk under said strip of stiff hairs, having a beveled upper edge, a band or girdle secured at the upper edge of said band of wire-gauze fabric, a strip of wire-gauze fabric secured to said band or girdle and depending therefrom, a piece of waterproof fabric secured to the lower edge of said strip of wire-gauze fabric on its upper edge and to the tree-trunk on its lower edge, and cotton-batting in the space inclosed by said waterproof fabric and the tree-trunk, substantially as shown and described.

10. In an insect-trap, in combination with a tree-trunk, a band of wire-gauze fabric encircling said tree-trunk directly beneath the lowest limb of the tree and spaced apart from the trunk, a strip of brush-bristles secured to the lower edge of said band of wire-gauze fabric, a chamber above said band of wire-gauze fabric, closed at its top and covered by another band of wire-gauze, a piece of waterproof fabric secured to the latter band of wire-gauze fabric and to the tree-trunk, and a nest-inducing substance inclosed by said waterproof fabric, substantially as shown and described.

In testimony whereof I hereto affix my signature in the presence of two witnesses.

STEPHEN R. WELCH.

Witnesses:
A. L. PENBERTHY,
M. L. HOVEY.